(12) United States Patent
Brown

(10) Patent No.: US 6,521,673 B1
(45) Date of Patent: Feb. 18, 2003

(54) COMPOSITION AND METHOD FOR PREPARING POLYURETHANES AND POLYURETHANE FOAMS

(75) Inventor: Scott A. Brown, Spring, TX (US)

(73) Assignee: Polythane Systems, Inc., Spring, TX (US)

(*) Notice: Subject to any disclaimer, the term of this patent is extended or adjusted under 35 U.S.C. 154(b) by 0 days.

(21) Appl. No.: 09/685,309

(22) Filed: Oct. 10, 2000

Related U.S. Application Data

(60) Provisional application No. 60/163,414, filed on Nov. 3, 1999.

(51) Int. Cl.$^7$ ................................................. C08J 9/00
(52) U.S. Cl. ........................ 521/130; 521/170; 528/48; 404/78
(58) Field of Search ................................ 521/130, 170; 528/48; 404/78

(56) References Cited

U.S. PATENT DOCUMENTS

| | | | |
|---|---|---|---|
| 3,968,657 A | | 7/1976 | Hannay |
| 4,016,318 A | * | 4/1977 | DiGioia et al. ............... 428/95 |
| 4,567,708 A | | 2/1986 | Haekkinen |
| 4,715,746 A | | 12/1987 | Mann et al. |
| 4,761,099 A | | 8/1988 | Mann et al. |
| 4,792,262 A | | 12/1988 | Kapps et al. |
| 4,966,497 A | | 10/1990 | Kirby |
| 4,987,156 A | * | 1/1991 | Tozune et al. ................ 521/99 |
| 5,232,956 A | * | 8/1993 | Gabbard et al. ............. 521/107 |
| 5,328,648 A | | 7/1994 | McBrien et al. |
| 5,372,462 A | | 12/1994 | Sydansk |
| 5,462,390 A | | 10/1995 | Sydansk |
| 5,466,094 A | | 11/1995 | Kirby et al. |
| 5,922,779 A | | 7/1999 | Hickey |
| 5,951,796 A | * | 9/1999 | Murray ......................... 156/78 |
| 6,288,133 B1 | * | 9/2001 | Hagquist ...................... 521/163 |

FOREIGN PATENT DOCUMENTS

JP 358183722 A * 10/1983 ............... 528/76

OTHER PUBLICATIONS

ASTM D 2126–87, *Standard Test Method for Response of Rigid Cellular Plastics to Thermal and Humid Aging*, Annual Book of ASTM Standards, Apr. 1987, pp. 208–209.
ASTM D 2856–87, *Standard Test Method for Open Cell Content of Rigid Cellular Plastics by the Air Pycnometer*, Annual Book of ASTM Standards, Jun. 1987, pp. 422–426.

* cited by examiner

Primary Examiner—James J. Seidleck
Assistant Examiner—Melanie Bissett
(74) Attorney, Agent, or Firm—Akin Gump Strauss Hauer & Feld LLP

(57) ABSTRACT

Polyurethane forming compositions having a water insoluble, non-hydrocarbon diluent provide polyurethanes with improved properties. Polyurethane forming reaction mixtures having a water insoluble diluent provide compositions that permit the formation of polyurethanes in the presence of excess water. Polyurethane forming reaction mixtures having a water insoluble diluent provide compositions that permit the formation of water-blown, low-density polyurethanes in the presence of excess water. Polyurethane forming reaction mixtures having a water insoluble diluent provide compositions that permit the formation of water-blown, low-density polyurethanes. Polyurethane forming compositions having a water insoluble, non-hydrocarbon diluent provide polyurethane foams with improved dimensional stability properties. Polyurethane forming compositions having a water insoluble, non-hydrocarbon diluent provide polyurethane elastomers in the presence of water.

13 Claims, 1 Drawing Sheet

COMPOSITION AND METHOD FOR PREPARING POLYURETHANES AND POLYURETHANE FOAMS

CROSS-REFERENCE TO RELATED APPLICATIONS

This application claims the benefit of U.S. Provisional Application No. 60/163,414, filed Nov. 3, 1999.

STATEMENT REGARDING FEDERALLY SPONSORED RESEARCH

Not applicable.

BACKGROUND OF THE INVENTION

1. Field of the Invention

This invention relates to a composition for preparing polyurethane foams with improved dimensional stability. This invention further relates to a composition for preparing a polyurethane in a wet environment. This invention further relates to a method for strengthening and sealing voids and geological formations which are moist or contain water. This invention further relates to a method for repair, restoration and rehabilitation of earth supported concrete slabs and other structures by the subsurface formation of polyurethane foams.

2. Description of the Related Art

Due to the mandated elimination of fluorocarbons and hydrochlorofluorocarbons, the polyurethane foam industry is seeking alternate blowing agents. The non-reactive chemicals under consideration as replacements are hydrofluorocarbons, pentane, and other products currently under development. Water is currently used as a blowing agent for polyurethane foams, either as the sole blowing agent, or as a co-blowing agent in the presence of another blowing agent. The isocyanate (—NCO) reacts with the water (H—O—H) to create a urea with carbon dioxide ($CO_2$) as a byproduct of the reaction. The $CO_2$ gas, when trapped in the reacting mass of polyurethane, expands the polyurethane to lower the density and form the foam structure.

Water is useful in the production of open cell flexible foams and rigid polyurethane foams. When water is used as the sole blowing agent in rigid, closed cell foams having a density of less than about 4 lbs/ft$^3$, the foams are not dimensionally stable due to loss of gas pressure after the foam has set. Dimensional stability is a measure of the amount of volumetric change a foam undergoes on standing. Dimensional stability may be measured using specific ASTM standard methods such as D 2126-87. The loss of gas pressure is due to the escape of the $CO_2$ from the cell, and the resultant negative pressure within the cell results in shrinkage. This shrinkage may be significant. For example, a 2 lbs/ft$^3$ all water blown foam sample cut in a 2" cube may shrink to approximately half its original volume and have a prune-like appearance. One currently accepted method to increase dimensional stability is to increase the density of the polyurethane foam until the foam is stable, i.e., does not shrink significantly from loss of carbon dioxide.

The polyisocyanate component of polyurethane foam forming compositions is reactive with water. Reaction of the polyisocyanate with water converts some of the polyisocyanate into the corresponding amine. The amine can react with the polyisocyanate to form a polyurea with properties that may be undesirable and inferior to the polyurethane foam formed in the absence of the amine. Excluding water during a polyurethane foam forming reaction is not always practical. For example, injection of polyurethane foam forming components into the ground to alleviate subsidence can be affected by moisture in the ground. Although some methods are known which attempt to reduce the problems caused by undesired reactions of excess water with polyisocyanates, these methods have disadvantages.

Formation of a polyurethane in the presence of water has been accomplished in U.S. Pat. No. 4,761,099 by substantially removing the water by first injecting a polyisocyanate which is followed by a subsequent injection of a mixture of polyol and polyisocyanate. The first injection of polyisocyanate is believed to form, upon reaction with water, a polyurea. The polyurea reacts further with the polyisocyanate and polyol and is incorporated into the polyurethane. This two step process will give poor results if the first injection of polyisocyanate is insufficient to react with all of the water present. Further, the incorporation of the polyurea may result in inferior properties in the subsequently formed polyurethane.

Other methods to strengthen geological formations, described in U.S. Pat. No. 4,792,262, use polyols that are fat derivatives such as castor oil. These systems have poor compatibility with the polyisocyanate, have long curing times, react with water present in the formation, and are relatively expensive.

Water-blown polyurethane foam forming systems may be dimensionally unstable and very sensitive to water in excess of the amount needed to form the carbon dioxide blowing agent. Since isocyanate groups react with water, the process of reacting polyisocyanates in the presence of excess water is generally prohibitive. When a polyurethane forming mixture contacts water, the polyisocyanate reacts first, i.e., faster, with water, creating an amine that may react further with the remaining polyisocyanate to form a urea. The isocyanate thus reacted is not available to react with the polyol to form the urethane linkage. One way to compensate for the water reaction is to pre-polymerize the polyisocyanate, thereby reducing the available NCO groups. This process has the disadvantage of increasing the viscosity of the mixture prior to the final polyurethane foam forming reaction.

Another method to compensate for the reaction of the polyisocyanate with water is to increase the reactivity of the polyisocyanate or the polyol. This is done to form the urethane linkages before the water interferes with the polyurethane foam forming reaction. This has the disadvantage of decreasing the amount of time before the polyurethane viscosity increases to a point at which it will no longer flow as a liquid. This reduces the amount of time in which the polyurethane forming composition must be completely injected into a void to be filled or into a substrate to reduce or eliminate earth subsidence, water seepage or into a substrate to stabilize and/or compact the substrate.

A need exists for a polyurethane foam forming composition for forming a low density water-blown polyurethane foam with good dimensional stability. Also, a need exists for a polyurethane foam forming composition for forming a low density water-blown polyurethane foam with good dimensional stability in the presence of water in excess of the amount of water needed to form carbon dioxide as the blowing agent.

A need exists for a polyurethane foam forming composition for forming a nonwater-blown polyurethane foam with good dimensional stability in the presence of water.

A need exists for an improved polyurethane foam forming composition suitable for subsurface injection to stabilize or reduce earth subsidence beneath a concrete slab or other structure.

A need exists for a diluent or additive for use with a polyurethane foam forming composition for forming a polyurethane foam that retards reaction of a polyisocyanate with water in the environment.

A need exists for a method of reducing or stabilizing earth subsidence of concrete slabs or other structures by subsurface injection of an improved polyurethane foam forming composition for forming water-blown polyurethane foam with good dimensional stability in the presence of excess water beyond that needed to generate the carbon dioxide blowing agent.

A need exists for an improved method for forming water-blown polyurethane foam with good dimensional stability in the presence of water in excess of the amount of water needed to form carbon dioxide as the blowing agent.

A need exists for a method for forming a nonwater-blown polyurethane foam with good dimensional stability in the presence of water.

SUMMARY OF THE INVENTION

Polyisocyanates and polyols may react together in the presence of water to form a polyurethane. The water reacts with some of the polyisocyanate to generate an amine and carbon dioxide. As the amine and polyol react with the polyisocyanate, the mixture begins to gel and the carbon dioxide causes the reactive mixture to form a foam. Generally, water is more reactive with a polyisocyanate than is a polyol and an excess amount of water causes the formation of an excess of the desired carbon dioxide and amine which leads to an inferior, undesirable polymeric material. The present invention provides an improved polyurethane foam forming composition and a method of using the improved polyurethane foam forming composition which permits the formation of a polyurethane by the reaction of a polyisocyanate and polyol, even in the presence of an amount of water in excess of the amount needed to generate carbon dioxide as a blowing agent.

One embodiment according to the present invention is a polyurethane foam forming composition comprising a polyisocyanate, a polyol, a blowing agent and a substantially water insoluble diluent that is substantially unreactive with a polyisocyanate.

One embodiment according to the present invention is a polyurethane foam forming composition comprising a polyisocyanate, a polyol, a blowing agent and a substantially water insoluble ester diluent that is substantially unreactive with the polyisocyanate.

One embodiment according to the present invention is a polyurethane foam forming composition for forming a low density polyurethane foam, having good dimensional stability, comprising a polyisocyanate, a polyol and a substantially water insoluble ester diluent that is substantially unreactive with the polyisocyanate.

One method of preparing the polyurethane foam according to the present invention includes mixing the polyisocyanate or the polyol or both in a substantially water insoluble diluent prior to or simultaneously with the mixing of the polyisocyanate and polyol to form the polyurethane foam.

One embodiment of the present invention is a polyurethane elastomer forming composition having a substantially water insoluble and substantially non-reacting diluent which permits the formation of the elastomer in the presence of water.

One embodiment according to the present invention is a method of stabilizing, correcting or reducing ground subsidence by introducing a polyurethane foam forming composition having a substantially non-reactive and substantially water insoluble diluent into the area of subsidence.

One embodiment according to the present invention is a method of stabilizing, correcting or reducing ground subsidence by introducing a polyurethane foam forming composition, into the area of subsidence, having a substantially non-reactive and substantially water insoluble diluent, a polyisocyanate, a polyol and a blowing agent.

BRIEF DESCRIPTION OF THE DRAWINGS

For a further understanding of the nature, objects and advantages of the present invention, reference should be made to the following detailed description, read in conjunction with the following drawings, wherein like reference numerals indicate like elements and wherein.

DETAILED DESCRIPTION OF INVENTION

Figure 1:
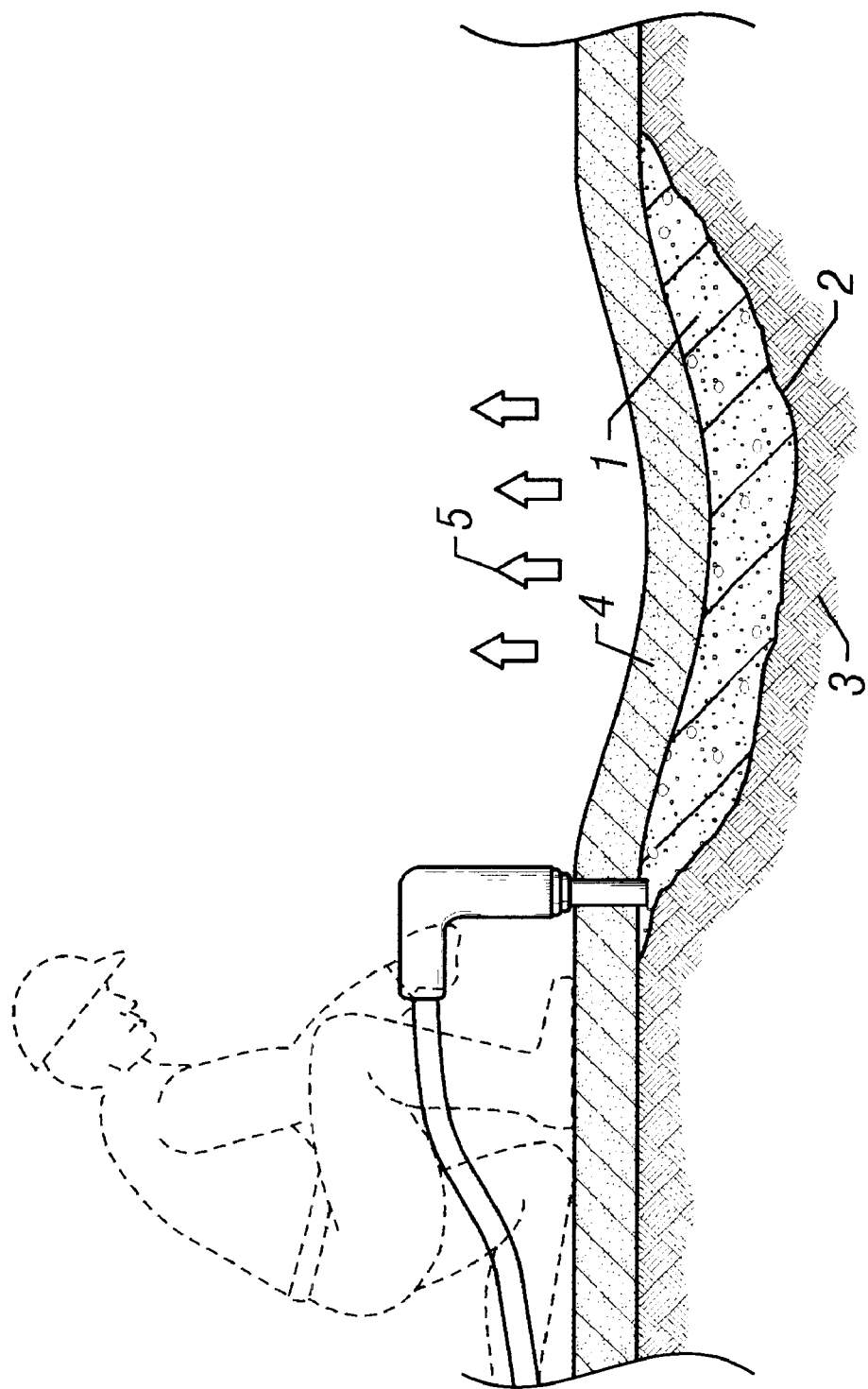
FIG. 1 shows a side sectional view of injection of the polyurethane forming composition being used to fill a geological void or area of subsidence to raise a surface subsidence.

The use of a substantially non-water soluble diluent for a polyisocyanate and/or a polyol component of a polyurethane unexpectedly provides a composition that permits the formation of a water-blown, low-density polyurethane. Unexpectedly, the use of a substantially non-water soluble diluent for a polyisocyanate and/or a polyol component of a polyurethane forming composition provides a composition that permits the formation of a polyurethane in the presence of excess water. The use of a substantially non-water soluble diluent for a polyisocyanate and/or a polyol component of a polyurethane unexpectedly provides a composition that permits the formation of a water-blown, low-density polyurethane in the presence of excess water. The low density foams typically have a density less than about 5 lbs/ft$^3$.

Diluent

Retarding the reactivity of water with a polyisocyanate has unexpectedly been achieved by mixing the polyisocyanate (A-side) or polyol (B-side) or both in a substantially water insoluble diluent which is substantially non-reactive with the polyisocyanate. Alternatively, the separate diluent, A-side, and B-side components may be simultaneously co-injected and mixed to form a polyurethane product. Diluents which are useful include, but are not limited to, esters. Diesters are more preferred and are exemplified by, but not limited to, 2,2,4-trimethyl-1,3-pentanediol diisobutyrate (sold by Eastman Chemical Company under the trademark TXIB). The diluent may be present in a range of from about 2 weight % to about 70 weight % of the total polyurethane polymer. The diluent more preferably is present in the range of from about 5 weight % to about 60 weight %.

Polyisocyanate

The term polyisocyanate as used herein refers to any isocyanate having an average functionality greater than or equal to about 2.0. The polyisocyanate component (A-side) used in the compositions and methods according to the present invention is preferably based on diphenylmethane diisocyanates such as those obtainable by aniline/formaldehyde condensation followed by phosgenation ("polymeric MDI") or derivatives of these polyisocyanates which may contain carbodiimide, biuret, urethane, isocyanurate, allophanate groups, and mixtures of compounds having these groups, and are liquid at room temperature. Useful polyisocyanates and mixtures include, but are not limited to, those that are liquid at room temperature and have been obtained by the phosgenation of aniline/formaldehyde condensates ("polymeric MDI") and their liquid, isocyanate-containing reaction products with sub-equivalent quantities (NCO/OH molar ratio=1:0.005 to 1:0.3) of polyfunctional alcohols, i.e., prepolymers. Preferred polyols have a molecular weight range of about 62 to about 3,000, and more preferred polyols have a molecular weight range of about 106 to about 3,000. Polyols containing ether and/or ester groups are useful. Mixtures of 2,4'- and 4,4'-diisocyanatodiphenyl methane which are liquid at room temperature are also suitable for use as polyisocyanate (A-side). Other organic polyisocyanates including, but not limited to, other aromatic polyisocyanates, aliphatic polyisocyanates, prepolymers formed from aromatic or aliphatic polyisocyanates and mixtures thereof may also be used according to the present invention. Alternatively, solid polyisocyanates may also be used if they are soluble in the diluent. Preferred polyisocyanates for preparation of polyurethane foams are exemplified by, but not limited to, polymeric MDI sold by Bayer under the trademark MONDUR MR, by BASF under the trademark LUPRANATE M20S, by The Dow Chemical Company under the trademark PAPI 27 or by Huntsman Chemical under the trademark RUBINATE M. A preferred polyisocyanate for the preparation of a polyurethane elastomer is exemplified by, but not limited to, a 143 equivalent weight modified 4,4'-diphenylmethane diisocyanate having an average functionality of about 2.1 such as MM 103 sold by BASF, MONDUR CD sold by Bayer, ISONATE 143L sold by The Dow Chemical Company or LF 1680 sold by Huntsman Chemical. Polyisocyanates and isocyanates having average isocyanate functionality greater than or equal to about 2.0 may also be used as the polyisocyanate component of the polyurethane forming reaction mixture.

In the reaction mixtures used in the methods according to the present invention, the individual components are present in such quantities that they correspond to an isocyanate index of from about 0.9 to about 5.0, preferably about 1.05 to about 4.0. By "isocyanate index" is meant the quotient of the number of isocyanate equivalents in the reaction mixture divided by the number of hydroxyl equivalents present in the reaction mixture, water counting as a difunctional compound.

Polyol

Polyol (also referred to as "B-side" and as "resin blend") is typically based on mixtures of organic polyhydroxyl compounds having an OH number of about 10 to about 6233, preferably from about 50 to about 1800. The polyols may have a nominal molecular weight average ranging from about 18 to about 10,000, preferably from about 18 to about 6000 and most preferably from about 90 to about 6000. The polyols have a hydroxyl functionality of from about 2 to about 8, preferably from about 2 to about 6. The polyhydroxyl compounds are preferably polyether polyols or mixtures of such polyether polyols known from polyurethane chemistry.

The polyhydroxyl compounds are generally mixtures of several components although pure polyhydroxyl compounds, i.e. individual compounds, may in principle be used. When single polyhydroxyl components are used, the conditions given above concerning the molecular weight and hydroxyl functionality apply to these individual compounds. When mixtures of various polyhydroxyl compounds are used, the particulars given above concerning the hydroxyl number apply to the average volume of the mixture as a whole. This means that individual components of a mixture may have hydroxyl numbers outside the given range.

The polyols may have primary hydroxyl groups, secondary hydroxyl groups or a mixture of primary and secondary hydroxyl groups. Further, the polyols may be partially or completely capped with ethylene oxide or propylene oxide to alter the reactivity of the polyols or to increase the molecular weight of the polyols.

Suitable polyether polyols include, but are not limited to, the ethoxylation and/or propoxylation products of 2- to 8-functional starter molecules such as, for example, water, ethylene glycol, 1,2-dihydroxy propane, trimethylol propane, diethylene glycol, triethylene glycol, dipropylene glycol, pentaerythritol, glycerol, sorbitol, sucrose, ethylene diamine, polytetramethylene glycol and butylene oxide based polyols. Suitable mixtures of this kind may be obtained, for example, by subjecting mixtures of starter molecules of the type mentioned above as examples to an ethoxylation and/or propoxylation reaction. Alternatively, polyhydroxyl polyethers which have been prepared separately may subsequently be mixed together to form the polyol component according to the present invention.

Alternatively, polyester polyols or mixtures of polyester polyols known from polyurethane chemistry may be used. The polyol components may also contain other polyhydroxyl compounds known from polyurethane chemistry such as castor oil or polyester polyols which may be obtained by the reaction of polyhydric alcohols of the type exemplified above with polybasic carboxylic acids such as adipic acids, dimethyl terephthalate, phthalic acid and/or phthalic acid anhydride. These polyester polyols preferably have a molecular weight average of 400 to about 4000. The polyol components may also contain small quantities of water (e.g. up to about 2% by weight).

Additives

The following are examples of suitable auxiliary agents and additives which may optionally be used.

Water

Water, which may be added in a quantity of up to about 5% by weight, preferably up to about 4% by weight, and most preferably up to about 2% by weight based on the weight of polyisocyanate.

Catalysts

Adding a conventional catalyst or combination of conventional catalysts alters the rate of the polyurethane foam formation. Catalysts for the isocyanate addition reaction include, but are not limited to, organic tin compounds such as tin (II) octoate, dibutyl tin dilaurate, UL-22 (sold by Witco Chemical Organics Division under the trademark WITCO FOMREZ UL-22) or lead naphthenate (PbN); or tertiary amines such as N,N-dimethyl cyclohexylamine (DMCHA) sold as PolyCat 8 by Air Products & Chemicals, 1,4-diazabicyclo[2.2.2]octane (TEDA) sold under the tradename DABCO by Air Products & Chemicals, and 70% bis(dimethylaminoethyl)ether in DPG (sold as BL-11 by Air Products & Chemicals); or amine polyol catalysts such as 33% TEDA in glycol or dimethylethanolarnine (DMEA); amine catalysts such as pentamethyldiethylenetriamine (PMDETA). These catalysts are generally used in a quantity of up to about 4% by weight, preferably from about 0.3 to about 1% by weight, based on the total quantity of the polyurethane forming composition. Other conventional amine and organometallic catalysts known for use in polyurethane forming reactions may be used. The type and amount of catalyst can be readily determined, by routine testing, by one of ordinary skill to provide the desired reaction time for a particular application.

Blowing Agents

Organic blowing agents include, but are not limited to, non-ozone depleting hydrofluorocarbons, non-ozone depleting hydrochlorofluorocarbons and aliphatic hydrocarbons. Conventional blowing agents known for preparing water-blown and non-water blown polyurethanes may be used. The blowing agents may be used singly or in mixtures. The use of individual blowing agents or mixtures of blowing agents is determined by the desired properties of the polyurethane. A person of ordinary skill in the art of preparing polyurethanes can make the selection of the proper blowing agent or combination of blowing agents for a particular application by routine testing.

Surfactants

Conventional foam regulators or surfactants such as the polyether polysiloxanes known to be useful in polyurethane foam forming reactions may be used. Non-silicone surfactants may also be used. The non-silicone surfactants include, but are not limited to, LK443 (sold by Air Products). Suitable surfactants may be obtained from Goldschmidt Chemical, Air Products & Chemicals, Inc., Witco or others. One example of a useful silicone surfactant is B8423 sold by Goldschmidt Chemical under the trademark TEGOSTAB B8423.

Other auxiliary agents and additives which may be used include, but are not limited to, conventional flame retarders (e.g. phosphoric acid derivatives and brominated or chlorinated compounds), and organic or inorganic fillers (e.g. urea, calcium carbonate, mica or talcum).

Auxiliary agents and additives used are generally mixed with polyol (B-side) before a polyurethane forming process is carried out. The polyurethane forming reaction mixture is typically prepared from a two component mixture. The polyurethane foam forming reaction mixture is prepared by vigorously mixing polyisocyanate with polyol or with the mixture of polyol and auxiliary agents and additives. The diluent may be pre-mixed with either the polyisocyanate or the polyol or, alternatively, may be added as a separate component. Mixing apparatus known in the art may be used for this purpose.

To prepare the reaction mixtures, the polyisocyanates and polyhydroxyl compounds are mixed together in the proportions required to provide about 0.9 to 5.0, preferably about 1.05 to 4.0 isocyanate groups for each isocyanate reactive group (in particular hydroxyl groups). The components are mixed in by conventional methods using conventional equipment.

Additionally, flame-retardants may be added to the polyurethane reaction mixture. Typically, the flame-retardants are added to the polyol (B-side), but non-reactive flame-retardants could be added to the polyisocyanate (A-side). Typical flame retardants include, but are not limited to, reactive bromine based compounds known to be used in polyurethane chemistry and chlorinated phosphate esters, including but not limited to, trichloropropylphosphate (TCPP).

Foams

The low-density water blown polyurethane foams of the present invention may be prepared by mixing either the polyisocyanate (A-side), the polyol (B-side) or both in the diluent. Alternatively, the diluent may be co-injected as a separate component into conventional equipment that will mix the diluent and the other components of the polyurethane forming reaction mixture. The mixture of the diluent and the other polyurethane foam components typically has a lower viscosity than the polyisocyanate or polyol component. Water is added to the polyol (B-side) in an amount calculated to provide the desired amount of carbon dioxide to act as a blowing agent. Polyols are hygroscopic, so the amount of water present in the polyol is typically measured and taken into account in calculating the amount of water to be added such that the total amount of water needed will be the sum of the water present in the polyol and the water added to the B-side. The polyisocyanate, polyol and water may be mixed by conventional methods including, but not limited to, static mixers. The polyurethane reaction mixture will form a polyurethane with the carbon dioxide acting as a blowing agent to cause the polyurethane to form a foam structure.

Water blown closed-cell, low-density rigid polyurethane foams made using conventional formulations generally have poor dimensional stability. Conventionally prepared water blown, closed-cell, low density polyurethane foams generally shrink and/or collapse over a period of time ranging from hours to months. The water blown closed cell, low density polyurethane foams use carbon dioxide, formed by the in situ reaction between water and a portion of the polyisocyanate present, to cause the reacting polymer mixture to foam. After the polyurethane foam is fully formed, the carbon dioxide may diffuse out of the closed cells faster than air can diffuse into the cells, creating a vacuum. The resulting pressure differential causes the foam to shrink and/or collapse. Surprisingly, the use of a diluent in the polyurethane forming reaction mixture permits the formation of water blown, closed-cell rigid foams with improved dimensional stability. Typically, the foams have a closed-cell content greater than about 50%, preferably greater than about 70% and more preferably greater than about 80%.

The formulation in Example 1 below, including TXIB as a diluent, when mixed with a polymeric MDI, such as MONDUR MR sold by Bayer or RUBINATE M sold by Huntsman Chemical, at a weight ratio of isocyanate to resin blend of 55.6 to 44.4 using conventional polyurethane foam equipment provides a resultant polyurethane foam with a density of about 3.0 lbs/ft$^3$. A second foam prepared from a second batch of the formulation in Example 1 provided a resultant polyurethane foam having a density of about 3.0 lbs/ft$^3$ and a closed cell content, according to ASTM D-2856, of about 94.6%. This demonstrated that the inclusion of TXIB in a formulation for water blown closed cell polyurethane foam had little or no adverse affect on the properties of the polyurethane foam based on the high closed-cell content.

The effect of a diluent, such as TXIB, on a polyurethane forming reaction mixture for a water blown low density polyurethane foam was subjected to an extreme test by exposure to excess water. The formulation of Example 1 was tested by injection directly into a 55 gallon drum filled with water. The reaction mixture initially sank to the bottom of the drum but floated to the surface of the water as the reaction mixture produced carbon dioxide which caused foaming and a reduction in density of the reaction material. The resultant polymer was a polyurea/polyurethane composition that had a density range of from about 0.97 to about 1.33 lbs/ft$^3$. The same formulation sprayed directly on the ground, without exposure to a large amount of water, i.e., exposure only to ambient moisture, had a density of about 2.74 lbs/ft$^3$. Although the material of Example 1, having TXIB present in the formulation when injected into the water, resulted in a polymer of mixed polyurea/polyurethane composition, this mixed polyurea/polyurethane composition was much superior compared to a similar test of a commercially available water blown foam forming composition which formed a water saturated mass of polyurea with very low structural integrity, i.e., the material crumbled when touched, which was unsuitable for testing.

Example 6 shows the improved properties of one embodiment according to the present invention in which the polyisocyanate is Mondur MR. The ratio of polyisocyanate to resin blend is about 55.4:44.6 by weight. The isocyanate index is about 1.05. The density of a sample from Example 6, tested according to ASTM D-1622, was about 2.71 lbs/ft$^3$. The sample from Example 6, tested according to ASTM D-1621, had a perpendicular compressive strength of about 20.69 psi and a parallel compressive strength of about 27.83 psi. The sample from Example 6, tested according to ASTM D-2856, gave a closed-cell content of 81.2%.

The dimensional stability of samples from Example 6 was determined according to ASTM D-2126. Samples were tested under differing combinations of temperature and relative humidity. The test conditions were 70° C. at 95% relative humidity, 100° C. at ambient relative humidity and minus 30° C. at ambient relative humidity. The volumes of the samples were checked at 1 day, 7 days, 14 days and 28 days. Volume changes of less than 1% are small and may be difficult to measure accurately.

A foam according to one embodiment of the present invention has a volumetric change of less than about 15% after storing the foam for 28 days at 70° C. and 95% relative humidity, preferably less than 10% after storing the foam for 28 days at 70° C. and 95% relative humidity, and most preferably less than 5% after storing the foam for 28 days at 70° C. and 95% relative humidity.

The sample tested at 70° C. at 95% relative humidity showed a maximum volume increase of 0.4% on day 1. The sample subsequently began to shrink showing only 0.1% increase by day 7 and by day 14 showed 0.3% volume decrease. By day 28, the sample showed a total volume change of about 0.4%.

The sample tested at 100° C. at ambient relative humidity showed a volume increase of 1.6% at day 1 which increased to 2.1% at day 7. The sample subsequently shrank showing only a 0.2% increase at day 14. By day 28, the sample showed a total volume change of about 1.70%.

The sample tested at minus 30° C. at ambient relative humidity showed a 0.4% volume increase at day 1 which remained unchanged at day 7. Subsequently, the sample shrank by day 14 having a 0.8% volume decrease. By day 28, the sample showed a total volume change of about 0.30%.

Unexpectedly, the use of a diluent in the polyurethane foam forming composition of the present invention even permits the formation of a dimensionally stable, low density, water blown polyurethane foam when at least the polyisocyanate is mixed in the diluent prior to injecting the mixture of polyisocyanate (A-side) and polyol/water (B-side). Without the diluent present, the otherwise same polyurethane foam forming mixture would form a significant amount of polyurea, an inferior foam which typically is brittle.

Additionally, it has been discovered that the inclusion of a diluent, such as TXIB, in a formulation for the preparation of open-cell foams show unexpected improvement in physical properties such as having a more uniform foam, i.e., the cells are of more uniform size relative to a similar foam prepared without the TXIB.

Polyureas

The polyisocyanates discussed above may be reacted with polyamines to form polyurea compounds. The polyamines include amines with functionality of from about 2 to about 3. The average molecular weight of the amines ranges from about 60 to about 5000; preferably from about 200 to about 5000; and most preferably from about 400 to about 5000. The additives described for use in the polyurethanes may also be used in the preparation of polyureas. Preferred amines are exemplified by, but not limited to, the JEFFAMINE T and JEFFAMINE D series sold by Huntsman Corporation.

Unexpectedly, the incorporation of a substantially non-reactive, water insoluble diluent into the reaction mixture used to form a polyurea achieves a polyurea without any substantial deterioration of properties as compared to a polyurea formed in the absence of the diluent. Suitable diluents include, but are not limited to, esters. More preferred diluents include diesters and a most preferred diluent is TXIB. Further, the inclusion of a diluent such as TXIB in a polyurea forming reaction mixture reduces the adverse affects of excess water.

Elastomers

Unexpectedly, as shown by Examples 2–5, it was discovered that polyurethane elastomers may be formed in the presence of excess water with reduced degradation of the polyurethane elastomer relative to preparing the same polyurethane elastomer in a wet environment when the polyurethane elastomer forming composition includes a diluent. As shown in Example 2, a polyurethane elastomer was prepared, by conventional methods, from the formulation using an ethylene oxide capped, 6000 molecular weight triol; 1,4-butanediol; a 143 equivalent weight 4,4'-diphenylmethane diisocyanate having an average functionality of about 2.1; and dibutyltindilaurate. The resultant polyurethane polymer was a firm elastomer with a density of about 62 lbs/ft$^3$. By contrast, the same formulation listed in Example 3, when mixed and poured into water forms a lower density (about 29 lbs/ft$^3$) polymer, that floats on the water, having a mixed composition as evidenced by the presence of both soft and hard portions. Comparison of Examples 2 and 3 demonstrates that the presence of the water interferes with the polyurethane forming reaction of a conventional formulation for preparing a polyurethane elastomer.

As shown by Examples 4 and 5, the presence of a diluent may reduce the degradation in the quality of a polyurethane elastomer made in the presence of water. In Example 4, an elastomer was made using a formulation having an ethylene oxide capped, 6000 molecular weight triol; 1,4-butanediol; a 143 equivalent weight 4,4'-diphenylmethane diisocyanate having an average functionality of about 2.1; dibutyltindilaurate and TXIB. The resultant polymer was a firm elastomer having a density of about 67 lbs/ft$^3$. Example 5 demonstrates that when the same formulation was subjected to an extreme test by being poured into water, the reaction mixture sank to the bottom of the water and remained there while continuing to react to form an elastomer similar to one formed in the absence of water. The polyurethane elastomer having TXIB, when formed in water, had a density of about 69 lbs/ft$^3$.

The Examples 2–5 demonstrate that formulations, for the preparation of polyurethane elastomers, which incorporate diluents, such as TXIB, substantially reduce water induced degradation in the formation of a polyurethane elastomer even in the presence of large amounts of water. The use of TXIB in polyurethane elastomer formulations is applicable to low and high-density elastomers.

Subsidence Correction

Use of the polyurethane foam forming composition described above provides a method to stabilize geological formations and to reduce or eliminate subsidence problems associated with surface structures such as highways. Other uses include injection of the polyurethane foam forming composition into a substrate to reduce or eliminate water flow or water leakage or to stabilize and/or compact the substrate. A known method of reducing subsidence is disclosed in U.S. Pat. No. 4,567,708 which is fully incorporated by reference. Referring to FIG. 1, the method according to the present invention includes the steps of mixing a polyisocyanate, a polyol, a blowing agent and a substantially water insoluble and non-reactive diluent, and injecting the polyurethane foam forming mixture 1 into the void 2 or substrate 3 beneath the structure 4. Arrows 5 indicate movement of the structure 4 as the mixture 1 expands in the void 2 shown in FIG. 1.

Optionally, additives such as catalysts or surfactants as previously described may be added to the mixture prior to injection. Preferred diluents include, but are not limited to, esters. Dibasic esters, such as TXIB, are more preferred.

This method may also use a modified polyisocyanate as the polyisocyanate component of the foam forming mixture. The modified polyisocyanate includes, but is not limited to, isocyanate prepolymers and isocyanate homopolymers. Also, a polyurea foam may be used by replacing all or at least a substantial amount of the polyol with a polyamine, as described above.

According to the present invention, the use of a substantially non-reactive, water insoluble diluent permits the preparation of low density water blown polyurethane foams with good dimensional stability. The use of a diluent also permits the formation of polyurethane foams and elastomers in the presence of quantities of water that would impair the quality of the foams or elastomers made in the absence of the diluent.

The foregoing disclosure and description of the invention are illustrative and explanatory thereof, and various changes in the details of the illustrated apparatus and construction and method of operation may be made without departing from the spirit of the invention.

| Ingredient | Parts By Weight |
|---|---|
| R-470-X | 10 |
| 40–770 | 36 |
| TXIB | 47.4 |
| PC-5 | 0.3 |
| DMEA | 1.9 |
| UL-2 | 0.025 |
| BL-11 | 0.2 |
| B8423 | 1.8 |
| Water | 2.4 |
| Total | 100.025 |

The above resin blend was reacted with polymeric MDI (MONDUR MR or RUBINATE M) in a weight ratio of 44.6 to 55.4. R-470-X is sold by The Dow Chemical Company under the trademark VORANOL R-470-X. PC-5 is PMDETA. B8423 is a silicon surfactant sold by Goldschmidt Chemical Company under the trademark TEGOSTAB® B 8423. 40-770 is a tetrol, with a hydroxyl number average of 770, sold by Arch Performance Urethanes and Organics.

ELASTOMER EXAMPLES 2 AND 3

| Ingredient | Parts by Weight | Example 2 Density (lbs/ft$^3$) | Example 3 Density (lbs/ft$^3$) |
|---|---|---|---|
| M3901 | 85.0 | | |
| BDO Crosslinker | 15.0 | | |
| T-12 | 0.01 | | |
| Water present | | No | Yes |
| Total | 100.1 | 62 | 29 |

The resin blends above were reacted with ISONATE 143L at an index of about 1.1

ELASTOMER EXAMPLE 4 AND 5

| Ingredient | Parts by Weight | Example 4 Density (lbs/ft$^3$) | Example 5 Density (lbs/ft$^3$) |
|---|---|---|---|
| M3901 | 85.0 | | |
| BDO Crosslinker | 15.0 | | |
| T-12 | 0.01 | | |
| TXIB | 10.0 | | |
| Water Present | | No | Yes |
| Total | 110.1 | 67 | 69 |

The resin blends above were reacted with ISONATE 143L at an index of about 1.1

EXAMPLE 6

| Ingredient | Parts by Weight |
|---|---|
| 470X | 12.00 |
| 40–770 | 33.25 |
| TXIB | 48.00 |
| PC-5 | 0.25 |
| DMEA | 1.70 |
| UL-22 | 0.025 |
| BL-11 | 0.20 |
| 8423 | 1.80 |
| Water | 2.80 |
| Total | 100.025 |

The above resin blend was reacted with polymeric MDI (MONDUR MR or RUBINATE M) in a weight ratio of 44.6 resin blend to 55.4 to isocyanate. The isocyanate index is 1.05.

PHYSICAL PROPERTIES OF EXAMPLE 6

| Property | Test Method | Result | Result |
|---|---|---|---|
| Density | ASTM-1622 | 2.71 lb/ft$^3$ | 2.7 lb/ft$^3$ |
| Compressive strength | ASTM-1621 | | |
| Perpendicular | | 20.69 psi | 20.69 psi |
| Parallel | | 27.83 psi | 27.83 psi |
| % Closed cell | ASTM D-2856 | 81.2 | 81.2 |

-continued

| Property | Test Method | Result | Result | | |
|---|---|---|---|---|---|
| Dimensional Stability | ASTM D-2126 | | | | |
| % Volume Change | | 1 Day | 7 Day | 14 Day | 28 day |
| 70° C./95% RH | | 0.4 | 0.1 | −0.3 | 0.40 |
| 100° C./ambient RH | | 1.6 | 2.1 | 0.2 | 1.70 |
| −30° C./ambient RH | | 0.4 | 0.4 | −0.8 | 0.30 |

I claim:

1. A composition for preparing a rigid foam, the composition consisting essentially of:
   a polyisocyanate component;
   a polyol component;
   catalyst;
   surfactant;
   water; and
   2,2,4-trimethyl-1,3-pentanediol diisobutyrate.

2. The composition of claim 1, wherein the foam has a closed-cell content greater than about 50% of the cells.

3. The composition of claim 1, wherein the foam has a volumetric change of less than about 15% after storing the foam for 28 days at 70° C. and 95% relative humidity.

4. The composition of claim 1, wherein the foam has a density of less than about 5 pounds per cubic foot.

5. The composition of claim 1, wherein an isocyanate index ranges from about 0.9 to about 5.0.

6. The composition of claim 1, wherein the composition components correspond to an isocyanate index of about 1.05 to about 4.0.

7. The composition of claim 1, wherein the polyurethane foam has a closed cell content greater than about 80%.

8. The composition of claim 1, wherein 2,2,4-trimethyl-1,3-pentanediol diisobutyrate is between about 2% and about 21% by weight of the total composition.

9. The composition of claim 1, wherein polyisocyanate, polyol, and 2,2,4-trimethyl-1,3-pentanediol diisobutyrate are at least about 80% by weight of the total composition.

10. The composition of claim 1, wherein polyisocyanate, polyol, and 2,2,4-trimethyl-1,3-pentanediol diisobutyrate are at least about 97% by weight of the total composition.

11. A method of preparing a rigid foam, the method comprising:
   (a) mixing components of a reaction mixture consisting essentially of:
      (1) polyisocyanate;
      (2) polyol;
      (3) catalyst;
      (4) surfactant;
      (5) water; and
      (6) 2,2,4-trimethyl-1,3-pentanediol diisobutyrate; and
   (b) allowing the reaction mixture to react and form the rigid foam.

12. The method of claim 11, wherein polyisocyanate, polyol, and 2,2,4-trimethyl-1,3-pentanediol diisobutyrate are at least about 80% by weight of the total reaction mixture.

13. The method of claim 11, wherein polyisocyanate, polyol, and 2,2,4-trimethyl-1,3-pentanediol diisobutyrate are at least about 97% by weight of the total reaction mixture.

* * * * *